US012779964B2

(12) United States Patent
Renken

(10) Patent No.: US 12,779,964 B2
(45) Date of Patent: Nov. 3, 2026

(54) EASY ACCESS STORAGE FOR AUTOMOTIVE SHELL

(71) Applicant: Renken, LLC, Camp Verde, AZ (US)

(72) Inventor: Jeremy Renken, Camp Verde, AZ (US)

(73) Assignee: Renken, LLC, Camp Verde, AZ (US)

( * ) Notice: Subject to any disclaimer, the term of this patent is extended or adjusted under 35 U.S.C. 154(b) by 287 days.

(21) Appl. No.: 18/676,926

(22) Filed: May 29, 2024

(65) Prior Publication Data

US 2025/0368016 A1 Dec. 4, 2025

(51) Int. Cl.
*B60J 7/20* (2006.01)

(52) U.S. Cl.
CPC ....................................... *B60J 7/20* (2013.01)

(58) Field of Classification Search
CPC .......................................................... B60J 7/20
See application file for complete search history.

(56) References Cited

U.S. PATENT DOCUMENTS 4,467,944 A * 8/1984 Manko ....................... B60J 7/20 224/570
5,193,874 A * 3/1993 German ................... B60J 7/106 224/544
6,497,351 B1 * 12/2002 Peele, Jr. ................. B60J 7/106 383/41
10,035,463 B1 * 7/2018 Salter ......................... B60R 5/04
11,377,038 B2 * 7/2022 Salter ....................... B60R 5/045
2005/0129478 A1 * 6/2005 Toles ......................... B60P 7/08 410/34
2006/0066140 A1 * 3/2006 Kirk ........................... B60J 7/11 296/218
2008/0284192 A1 * 11/2008 Lim .......................... B60R 7/02 296/37.5
2016/0362069 A1 * 12/2016 Mayfield ................. B60R 11/06
2021/0179018 A1 * 6/2021 Baumbick ................. B60R 7/02
2023/0089761 A1 * 3/2023 Ziolek ................... B60R 13/013 296/37.1

* cited by examiner

*Primary Examiner* — Taras P Bemko
(74) *Attorney, Agent, or Firm* — Kilpatrick Townsend & Stockton LLP

(57) ABSTRACT

An apparatus may include a top side, and support structures spanning a length across at least a portion of the top side. The apparatus may include: a first lateral side, connected to a first edge of the top side; a second lateral side, connected to a second edge of the top side, opposite the first edge of the top side; and a third lateral side, connected to a third edge of the top side and connected to the first lateral surface and the second lateral surface. The top side, the first lateral side, the second lateral side, and the third lateral side may define a cavity. The apparatus may include a shelf, connected to an inside surface of the third lateral side and a crosspiece, positioned such that the crosspiece supports at least a portion of the shelf when a vertical load is placed on the shelf.

20 Claims, 8 Drawing Sheets

EASY ACCESS STORAGE FOR AUTOMOTIVE SHELL

BACKGROUND

Automotive shells (or convertible tops) may be removed from a vehicle in order to provide access to environmental elements. Conversely, the automotive shells may be installed in order to prevent the elements from entering the vehicle. Certain automotive shells may be partially removed and stowed in the vehicle. However, the size and shape of the automotive shells may prevent convenient access to other gear within the vehicle, and vice versa.

BRIEF SUMMARY

An apparatus may include a top side may include one or more support structures spanning a length across at least a portion of the top side. The apparatus may include a first lateral side, connected to a first edge of the top side. The apparatus may include a second lateral side, connected to a second edge of the top side, opposite the first edge of the top side. The apparatus may include a third lateral side, connected to a third edge of the top side and connected to the first lateral surface and the second lateral surface, where the top side, the first lateral side, the second lateral side, and the third lateral side define a cavity. The apparatus may include a shelf, disposed within the cavity and connected to an inside surface of the third lateral side. The apparatus may include a crosspiece, spanning a width of the cavity and connected to an inside surface of the first lateral side and an inside surface of the second lateral side, positioned such that the crosspiece supports at least a portion of the shelf when a vertical load is placed on the shelf.

In some embodiments, the first lateral side may include a first lip extending from the first lateral surface and into the cavity. The second lateral side may include a may include a second lip extending from the second lateral surface and into the cavity. A bottom side may be in contact with the first lip and the second lip and extends along respective lengths of the first lateral side and the second lateral side. The top side may include a raised portion extending along a first edge of the top portion, the front edge opposite the third edge of the top portion. The apparatus may be manufactured from at least one of fiberglass, carbon fiber, or aluminum. The top side may include a rubberized material on at least a portion of the top side. The crosspiece may be mechanically connected to the shelf. A fourth lateral side may be connected to at least one of the first lateral side and the second lateral side with a hinge. First lateral side may be connected to the first edge of the top side via a first latch, the second lateral side is connected to the second edge of the top side via a second latch, and the third lateral side is connected to the third edge of the top side via a hinge, such that the top side opens vertically at the hinge. The top side may include a raised portion extending along a first edge of the top portion, the front edge opposite the third edge of the top portion.

An apparatus for storing automotive shells may include a top side may include one or more support structures spanning a length across at least a portion of the top side. The apparatus may include a first lateral side, in contact with a first edge of the top side. The apparatus may include a second lateral side, in contact with a second edge of the top side, opposite the first edge of the top side. The apparatus may include a third lateral side, in contact with a third edge of the top side and connected to the first lateral surface and the second lateral surface. The apparatus may include a bottom side, opposite the top side and in contact with the first lateral side, the second lateral side, and the third lateral side, where the top side, the first lateral side, the second lateral side, the third lateral side, and the bottom side define a cavity. The apparatus may include a shelf, disposed within the cavity and connected to respective inside surfaces of the first lateral side, the second lateral side, and the third lateral side, at least a portion of the shelf spanning a width of the cavity.

In some embodiments, the shelf spans the width of the cavity. The top side may be removable. The top side may be connected to at least one of the first lateral side and the second lateral side via a strut. The shelf may include a support structure extending from a surface of the shelf. The shelf may include one or more supports disposed within an interior of the shelf. The bottom side may be removeable. At least one of the top side, the first lateral side, the second lateral side, the third lateral side, or the bottom side may include a feature corresponding to a feature of a vehicle. The dimensions of a space defined within the cavity between the shelf and an inner surface of the top side corresponds to the dimensions of an automotive shell. The apparatus may be manufactured from at least one of fiberglass, carbon fiber, or aluminum.

DETAILED DESCRIPTION

Vehicles frequently have components that are removable in certain situations. Convertibles, for example, have convertible tops where in a first configuration, a top of the vehicle is closed and in a second configuration, the vehicle is open to the elements. Some convertible tops may be folded and stowed in the vehicle when in the second configuration. Other convertible tops may be removed from the vehicle completely. Having a vehicle open to the elements may be desirable in some conditions (e.g., sunny weather), while a closed vehicle is more desirable in others (e.g., in rain). Conditions, however, are not always constant and may change unexpectedly. If the convertible top is removed completely from the vehicle, converting the vehicle into the closed configuration quickly may be impossible, as the convertible top may not be in the vehicle. Thus, a driver of the vehicle may be forced to return to wherever the convertible top (e.g., home) is stowed in order to close the vehicle to the elements. During trips where the vehicle is close to home, returning to install the convertible top may be a minor inconvenience. The inconvenience, however, may be more pronounced during longer trips.

This inconvenience may be further exacerbated in off-road vehicles. For example, an off-road vehicle may include a convertible top. The off-road vehicle may be taken on a longer trip, as measured in time and/or distance from home. Furthermore, due to the unpredictable nature of off-road driving, the off-road vehicle may become stuck for a period of time, unable to return home to retrieve the convertible top. Even in on-road applications, retrieving the convertible top may be impractical. However, due to the shape and weight of convertible tops (or "automotive shells"), storing and accessing the automotive shells in the vehicle may be hindered by other gear stowed in the vehicle. Therefore, there is a need for an apparatus to conveniently store and access automotive shells.

Figure 1:
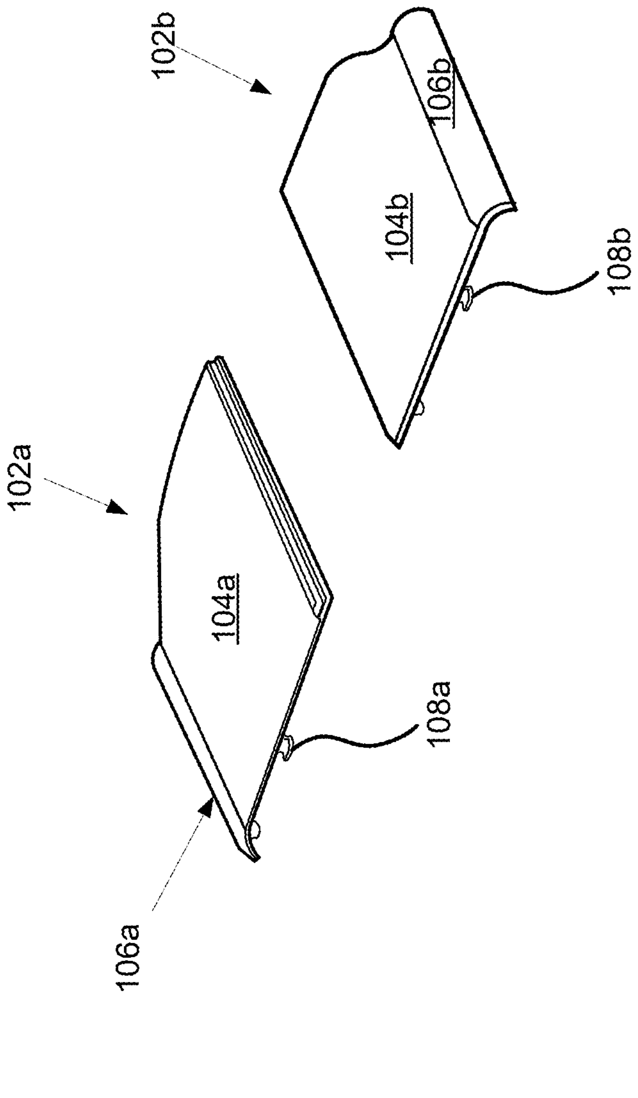
FIG. 1 illustrates automotive shells, according to certain embodiments.

FIG. 1 illustrates automotive shells 102*a-b*, according to certain embodiments. The automotive shells 102*a-b* may be part of a larger automotive top (e.g., a convertible top) that is removable from a vehicle. The automotive shells 102*a-b* may be removeable from the larger auto motive top and/or the vehicle itself. The automotive shells 102*a-b* may include an upper portion 104*a-b* and a lateral portion 106*a-b*, respectively. The automotive shells 102*a-b* may be identical or may be mirrored. For example, the automotive shell 102*a* may correspond to a right side of the vehicle and the automotive shell 102*b* may correspond to a left side of the vehicle. The lateral portion 106*a* may therefore be on a left side of the automotive shell 102*a*, whereas the lateral portion 106*b* may be on a right side of the automotive shell 102*b*.

The upper portion(s) 104*a-b* may be included in a roof or cover of the vehicle when installed on the vehicle. The lateral portion(s) 106*a-b* may be attached to a respective door frame of the vehicle when installed. Thus, the automotive shells 102*a-b* may prevent or reduce rain, sunlight, and other environmental factors from entering the vehicle when installed. When environmental conditions permit, however, the automotive shells 102*a-b* may be removed from the vehicle, exposing some or all of the vehicle to the elements. For example, the automotive shells 102*a-b* may be included as part of a roof of an off-road vehicle. A driver of the off-road vehicle may desire to open the off-road vehicle to the elements (e.g., because the conditions are pleasant). The driver may therefore remove the automotive shells 102*a-b* from the off-road vehicle. If the driver (and the off-road vehicle) is away from a storage place (e.g., home), the automotive shells 102*a-b* may be placed inside the off-road vehicle. However, based at least in part on the shape of the automotive shells 102*a-b*, the automotive shells 102-*ab* may occupy an unwieldy and/or inconvenient space within the off-road vehicle. Furthermore, a weight of the automotive shells 102*a-b* may be such that other gear stowed in the off-road vehicle may be affected. One solution may be to stow the automotive shells 102*a-b* underneath the other gear. However, the shape of the automotive shells 102*a-b* may be such that the other gear may move and shift during travel. The automotive shells 102*a-b* may not provide a level surface on which to securely stow other gear. Furthermore, subsequent access to the automotive shells 102*a-b* may be hindered by the other gear stowed in the off-road vehicle (i.e., on the automotive shells 102*a-b*). Weather conditions may change quickly, however, so easy access to the automotive shells 102*a-b* may be desired in order to quickly reinstall the automotive shells 102*a-b*. Therefore, there is a need for an apparatus with which to quickly store and access automotive shells.

Figure 2:
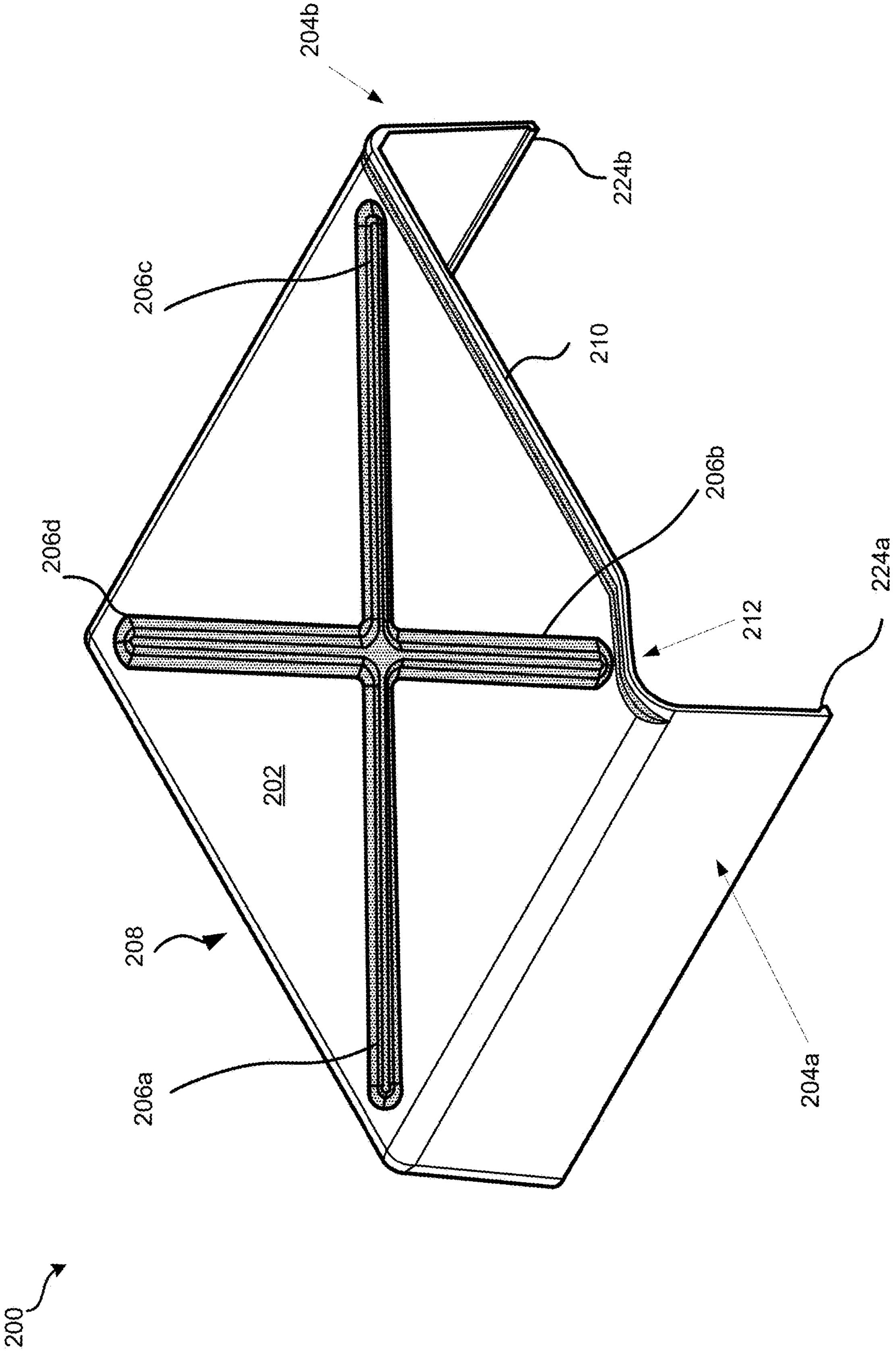
FIG. 2 illustrates a perspective view of an apparatus for storing automotive shells, according to certain embodiments.

FIG. 2 illustrates a perspective view of an apparatus 200 for storing automotive shells, according to certain embodiments. The apparatus 200 may be configured to store one or more automotive shells, such as the automotive shells 102*a-b* in FIG. 1. The apparatus 200 may include a top side 202, lateral sides 204*a-b*, and a back side 208. The top side 202, lateral sides 204*a-b*, and the back side 208 may define a cavity within the apparatus 200. The top side 202 may include one or more supports 206*a-b* and raised portion 210. The lateral sides 204*a-b* may include lips 224*a-b*. In some embodiments, the back side 208 may also include a lip. The apparatus 200 may be formed of fiberglass, carbon fiber, plastic, polymers, aluminum (or other suitable metals), and/or other suitable materials. The apparatus 200 may be configured to correspond to an interior of a vehicle. Therefore, the dimensions of the apparatus 200 may correspond to one or more interior spaces of the vehicle and include features such as the feature 212 that correspond to features inside the vehicle.

The top side 202 may be substantially planar across an outer surface of the top side 202. In some embodiments, the top side 202 may include any number of concave or convex aspects (e.g., one or more domed sections). The top side 202 of the apparatus 200 may include approximately the same dimensions as an automotive shell. For example, an automotive shell may include a width and a length (e.g., 18 inches wide and 14 inches long. A width of the top side 202 (as measured along an edge extending between the lateral sides 204*a-b*) may then be 18 inches, 20 inches, 22 inches, etc. A length of the top side 202 (e.g., as measured along an edge of the lateral side 204*b*) may be 15 inches, 20 inches, etc. The dimensions described above are merely examples; one of ordinary skill in the art would recognize many different possibilities.

The support structures 206*a-d* may each include one or more raised portions extending from a center of the top side 202. In the example, shown in FIG. 2, there may be four support structures 206*a-d*, extending radially from the center of the top side 202 towards respective corners of the top side 202. In other example, there may be any number of support structures 206*a-d* extending towards any side, corner, edge, etc. of the top side 202. Additionally or alternatively, the top side 202 may include any number annular support structures about the center of the top side 202. The annular support structures may be circular, polygonal, elliptical, or any other suitable shape. Additionally or alternatively, the support structures 206*a-d* may include internal structures, embedded in the top side 202. For example, each of the support structures 206*a-d* may include one or more rods (e.g., 1, 2, 3, etc.) extending through a respective support structure 206*a-d*. The rods may extend along the length of each respective support structure 206*a-d* or extend through only part of each respective support structure. The metal rods may be formed of steel, aluminum, carbon fiber, or any other suitable material.

In the example shown in FIG. 2, the support structures 206*a-d* may be formed from the same material as the apparatus 200 (and the top side 202) and include a second material along each of the support structures 206*a-d*. The second material may reduce slippage of items placed on the top side 202. The second material may include a rubberized material, polymer, neoprene, or some other material. In other examples, the support structures 206*a-d* may not include the second material. In yet another example, the support structures 206*a-d* may be texturized and include a pattern of concave and/or convex features formed on a surface of each of the support structures 206*a-d*. In this way, slippage may be reduced while not including the second material.

The raised portion 210 of the top side 202 may extend along an edge of the top side 202. The edge may be opposite the back side 208 of the apparatus 200. The raised portion 210 may protrude from the top side 202 to retain (or at least partially retain) items placed on the top side 202. The raised portion 210 may protrude about 2 cm, about 3 cm, about 5 cm, etc. The raised portion 210 may extend along the entire edge of the top side 202 (e.g., from the lateral side 204*a* to the lateral side 204*b*) or along any portion of the top side 202. The raised portion 210 may be rounded or angular. The raised portion 210 may include the second material (as described above) and/or a texturized feature along a surface of the raised portion 210.

Figure 3A:
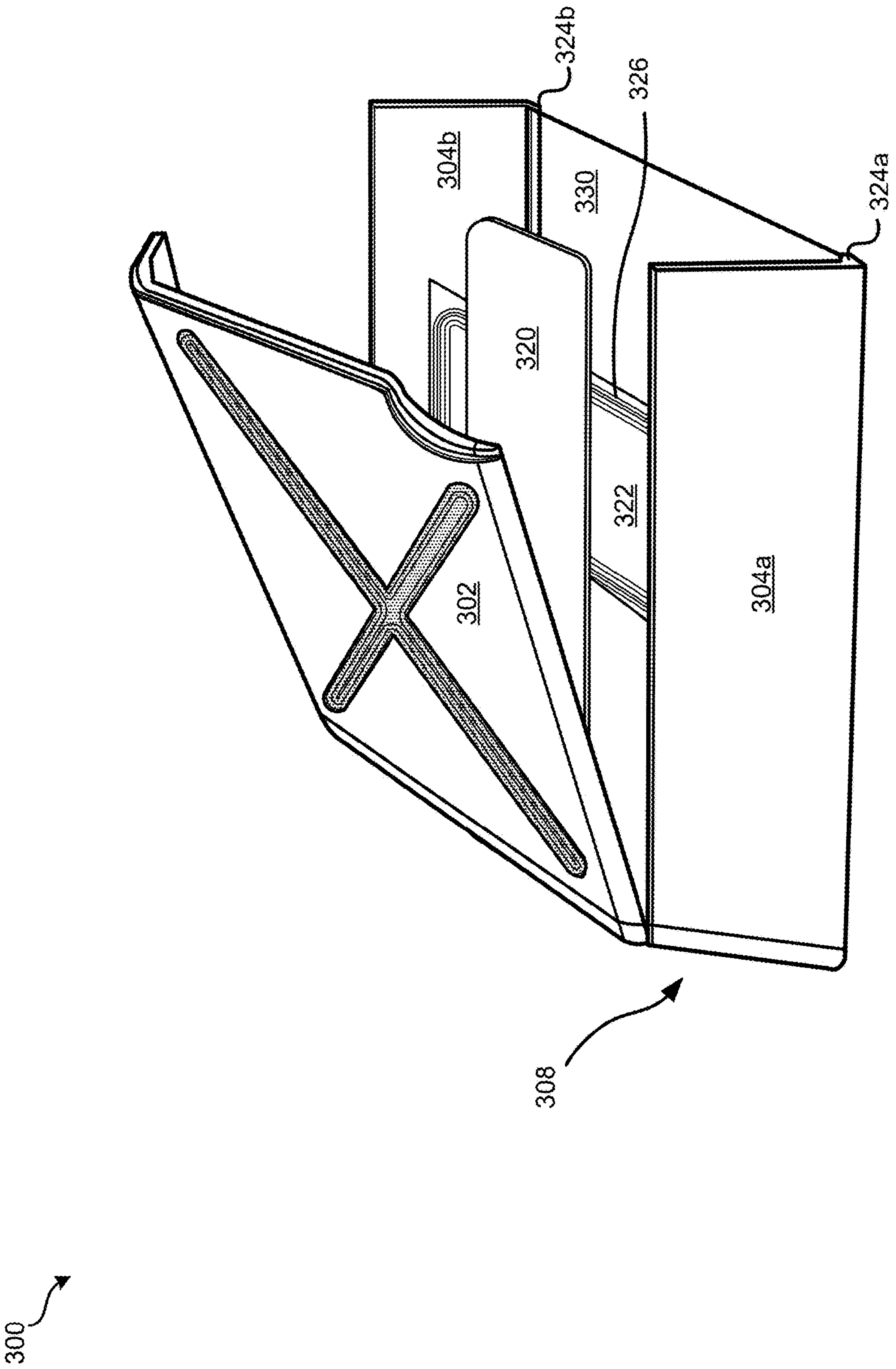
FIG. 3A illustrates a perspective view of an apparatus with a shelf, according to certain embodiments.

FIG. 3A illustrates a perspective view of an apparatus 300 with a shelf 320, according to certain embodiments. The apparatus 300 may be similar to the apparatus 200 and include similar features and functionalities. The apparatus 300 may include a top side 302 with support structures 306*a-d*, lateral side 304*a-b*, and back side 308. The apparatus 300 may also include a shelf 320, a crosspiece 322 with supports 326, and a bottom piece 330. Some or all of the components shown and described in relation to the apparatus 300 may be present in the apparatus 200 and vice versa. For example, the apparatus 200 may include a shelf similar to the shelf 320, and the apparatus 300 may include a raised portion similar to the raised portion 210.

The support structures 306*a-d* may each include one or more raised portions extending from a center of the top side 302. In the example, shown in FIG. 3A, there may be four support structures 306*a-d*, extending radially from the center of the top side 302 towards respective corners of the top side 302. In other example, there may be any number of support structures 306*a-d* extending towards any side, corner, edge, etc. of the top side 302. Additionally or alternatively, the top side 302 may include any number annular support structures about the center of the top side 302. The annular support structures may be circular, polygonal, elliptical, or any other suitable shape. Additionally or alternatively, the support structures 306*a-d* may include internal structures, embedded in the top side 302. For example, each of the support structures 306*a-d* may include one or more rods (e.g., 1, 3, 3, etc.) extending through a respective support structure 306*a-d*. The rods may extend along the length of each respective support structure 306*a-d* or extend through only part of each respective support structure. The rods may be formed of steel, aluminum, carbon fiber, or any other suitable material.

In the example shown in FIG. 3A, the support structures 306*a-d* may be formed from the same material as the apparatus 300 (and the top side 302) and include a second material along each of the support structures 306*a-d*. The second material may reduce slippage of items placed on the top side 302. The second material may include rubber, polymer, neoprene, or some other material. In other examples, the support structures 306*a-d* may not include the second material. In yet another example, the support structures 306*a-d* may be texturized and include a pattern of concave and/or convex features formed on a surface of each of the support structures 306*a-d*. In this way, slippage may be reduced while not including the second material.

The raised portion 310 of the top side 302 may extend along an edge of the top side 302. The edge may be opposite the back side 308 of the apparatus 300. The raised portion 310 may protrude from the top side 302 to retain (or at least partially retain) items placed on the top side 302. The raised portion 310 may protrude about 3 cm, about 3 cm, about 5 cm, etc. The raised portion 310 may extend along the entire edge of the top side 302 (e.g., from the lateral side 304*a* to the lateral side 304*b*) or along any portion of the top side 302. The raised portion 310 may be rounded or angular. The raised portion 310 may include the second material (as described above) and/or a texturized feature along a surface of the raised portion 310.

The top side 302 may be connected to the back side 308 via a hinge or other such connector such that the top side 302 may be opened with the hinge. The top side 302 may also include one or more latches, hooks, or other such connectors along edges where the top side 302 meets the lateral sides 304*a-b*. Thus, when the top side 302 is in a closed position, the top side 302 may be mechanically connected to the lateral sides 304*a-b*. Furthermore, although not shown in FIG. 3A, a strut may be connected to at least one of the lateral sides 304*a-b* and the top side 302. The strut may be a gas strut, a mechanical strut, a hydraulic strut, or any other suitable mechanism to prevent the top side 302 from closing while in an open position.

The bottom side 330 may be a removable bottom, configured to slide into the apparatus 300 resting on the first lip 324*a* and the second lip 324*b*. Alternatively, the bottom side 330 may be permanently affixed to the apparatus 300 via the lateral sides 304*a-b* and/or the back side 308. The bottom side 330 may be formed of the same material as the apparatus 300 or may be formed of a different material. For example, the apparatus 300 may be formed from fiberglass and the bottom side 330 may be formed from plastic, rubber, aluminum, etc.

The shelf 320 may be composed of the same material as the apparatus 300 or may be composed of a different material. The shelf 320 may be mechanically connected to an inner surface of the back side 308. For example, the shelf 320 may be connected to the back side 308 via adhesive, mechanical connector (e.g., screws, bolts, etc.), or any other suitable connector or combination thereof. In some embodiments, the shelf 320 may be permanently affixed to the back side 308. For example, the apparatus 300 (and therefore the back side 308) may be manufactured from fiberglass. The shelf 320 may therefore also be manufactured from fiberglass, and permanently affixed via fiberglass, catalyst, etc.

The crosspiece 322 may be connected to respective inside surfaces of the lateral surfaces 304*a-b*. For example, the crosspiece 322 may be connected to the lateral surfaces 304*a-b* via adhesive, mechanical connector (e.g., screws, bolts, etc.), or any other suitable connector or combination thereof. In some embodiments, the crosspiece 322 may be permanently affixed to the lateral surfaces 304*a-b*. For example, the apparatus 300 (and therefore the lateral surfaces 304*a-b*) may be manufactured from fiberglass. The crosspiece 322 may therefore also be manufactured from fiberglass, and permanently affixed via fiberglass, catalyst, etc. The crosspiece 322 may also include supports 326. The supports 326 may be similar to the support structures 206*a-d* in FIG. 2. Thus, the supports 326 may be characterized by a greater thickness (e.g., having more material than other parts of the crosspiece 322) and include the same material as the crosspiece 322. Additionally or alternatively, the supports 326 may include internal structures, embedded in the crosspiece 322. For example, each of the supports 326 may include one or more rods (e.g., 1, 2, 3, etc.). The rods may extend along the length of the supports 326 or extend through only part of the supports 326. The rods may be formed of steel, aluminum, carbon fiber, or any other suitable material.

The shelf 320 may be configured to support an automotive shell, such as the automotive shell 120*a* in FIG. 1. For example, the automotive shell 120*a* may be placed within the apparatus 300 such that the top surface 104*a* is in contact with the shelf 320. The lateral surface 106*a* may then extend away from the shelf 320, towards the top side 302. Additionally or alternatively, the automotive shell 102*a* may be placed such that the lateral surface 106*a* extends down around at least one edge of the shelf 320 (e.g., towards the bottom side 330). When the automotive shell is placed in the apparatus, a vertical load may be present on the shelf 320. The crosspiece 322 (or a portion thereof) may be configured to be in contact with the shelf 320 when the vertical load is placed on the shelf 320. In some embodiments, the shelf 320 may be in contract with the crosspiece 322 at all times. The crosspiece 322 may support some or all of the vertical load placed on the shelf 320. In some embodiments, the crosspiece 322 and the shelf 320 may be a unitary piece formed together prior to installation in the apparatus 300.

The shelf 320 and the crosspiece 322 may be positioned within the cavity such that a second automotive shell may be placed on the bottom surface 330. For example, the automotive shell 102*b* may be placed in the apparatus 300 such that the top surface 104*b* of the automotive shell 102*b* is in contact with the bottom side 330. The lateral surface 106*b* may then extend into the cavity towards the shelf 320 and/or the crosspiece 322. The shelf 320 and the crosspiece 322 may therefore be placed within the cavity such that there is enough space between the bottom side 330 and the shelf 320 and/or the crosspiece 322 such that the lateral surface 106*b* is not in contact with the crosspiece 322 and/or the shelf 320.

The shelf 320 and/or the bottom side 330 may include one or more features configured to engage with an automotive shell when the automotive shell is placed within the apparatus 300. For example, the shelf 320 may include a groove or protrusion placed some distance from the back side 308 (e.g., 1 inch, 2 inches, 3 inches, etc.). When an automotive shell is placed on the shelf 320, some portion of the automotive shell may engage with the groove, preventing (or inhibiting) the automotive shell from moving away from the back side 308. The bottom side 330 may include a similar feature to engage a second automotive shell. One or ordinary skill in the art would recognize many different possibilities and configurations.

Figure 3B:
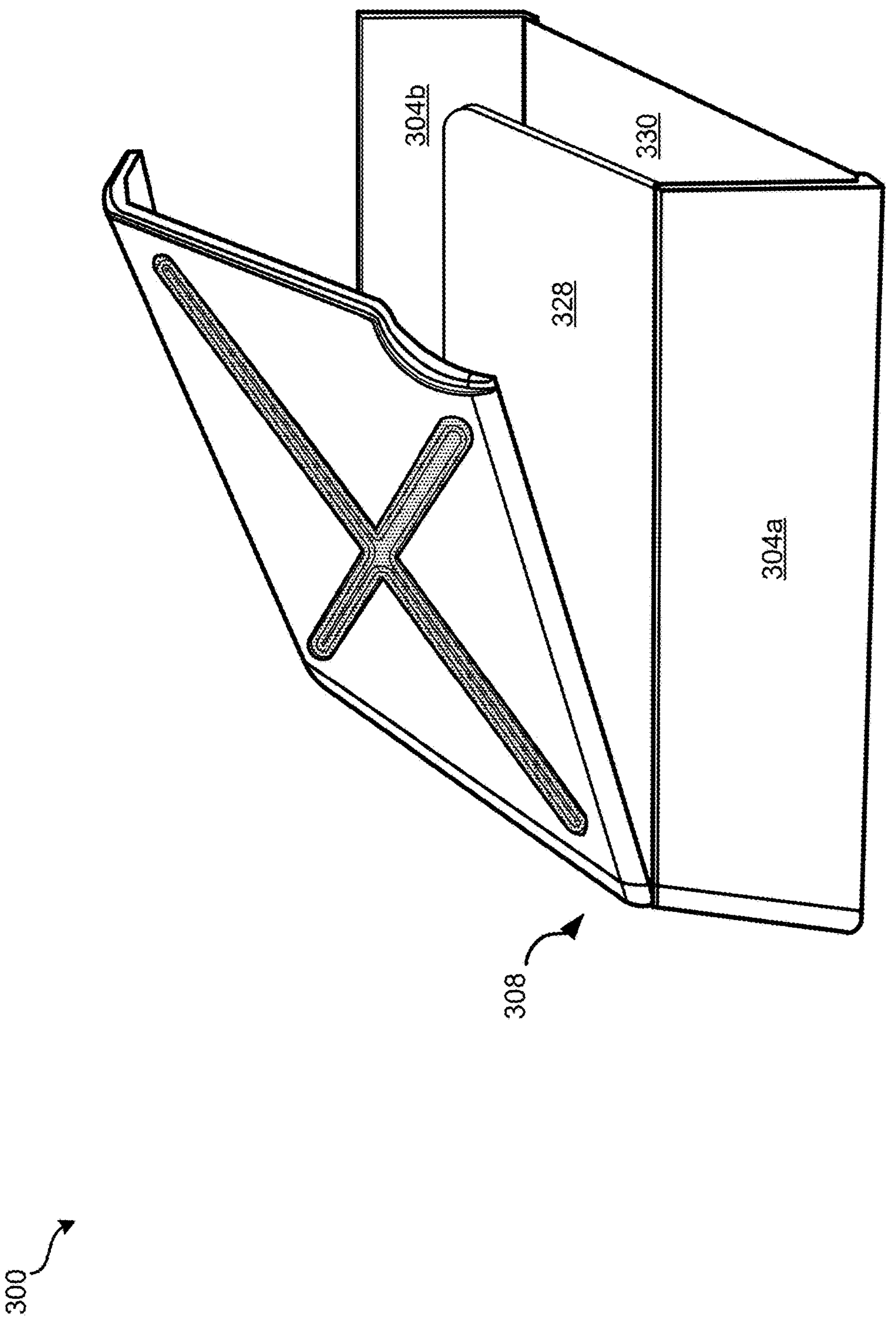
FIG. 3B illustrates a perspective view of an apparatus with a wide shelf, according to certain embodiments.

FIG. 3B illustrates a perspective view of the apparatus 300 with a wide shelf 328, according to certain embodiments. As shown in FIG. 3B, the wide shelf 328 may extend between the lateral surfaces 304*a-b* and be connected thereto (as well as to the back side 308). For example, the wide shelf 328 may be connected to the lateral surfaces 304*a-b* via adhesive, mechanical connector (e.g., screws, bolts, etc.), or any other suitable connector or combination thereof. In some embodiments, the wide shelf 328 may be permanently affixed to lateral surfaces 304*a-b*. For example, the apparatus 300 (and therefore lateral surfaces 304*a-b*) may be manufactured from fiberglass. The wide shelf 328 may therefore also be manufactured from fiberglass, and permanently affixed via fiberglass, catalyst, etc. The wide shelf 328 may be supported by the crosspiece 322 (not visible in FIG. 3B). In some embodiments, the crosspiece 322 may not be present.

Similar to the shelf 320, the wide shelf 328 and/or the bottom side 330 may include one or more features configured to engage with an automotive shell when the automotive shell is placed within the apparatus 300. For example, the wide shelf 328 may include a groove or protrusion placed some distance from the back side 308 (e.g., 1 inch, 2 inches, 3 inches, etc.). When an automotive shell is placed on the wide shelf 328, some portion of the automotive shell may engage with the groove, preventing (or inhibiting) the automotive shell from moving away from the back side 308. The bottom side 330 may include a similar feature to engage a second automotive shell. One or ordinary skill in the art would recognize many different possibilities and configurations.

Figure 3C:
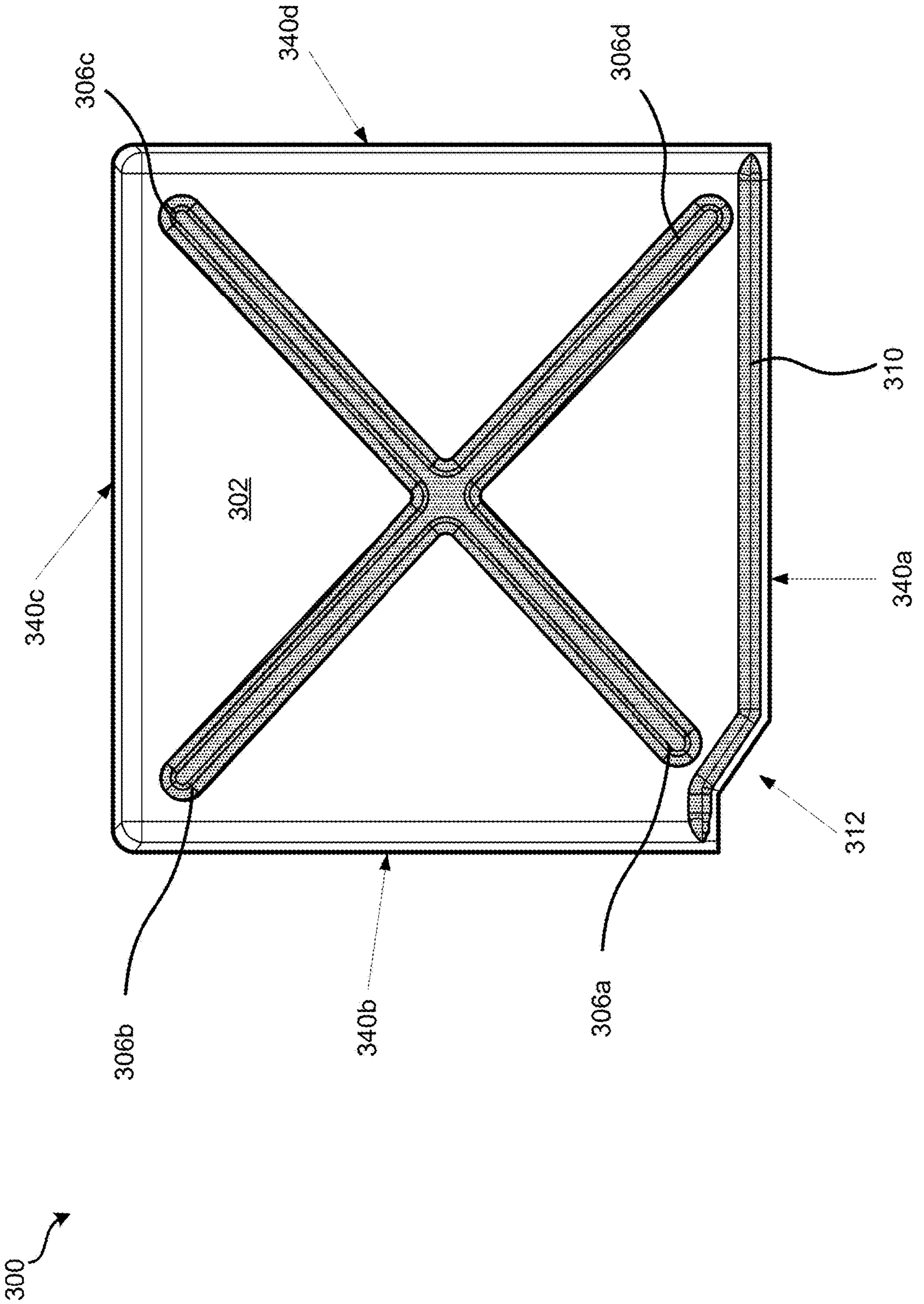
FIG. 3C illustrates a top down view of an apparatus, according to certain embodiments.

FIG. 3C illustrates a top down view of the apparatus 300, according to certain embodiments. The support structures 306*a-d* may each include one or more raised portions extending from a center of the top side 302. In the example, shown in FIG. 3, there may be four support structures 306*a-d*, extending radially from the center of the top side 302 towards respective corners of the top side 302. In other example, there may be any number of support structures 306*a-d* extending towards any side, corner, edge, etc. of the top side 302. Additionally or alternatively, the top side 302 may include any number annular support structures about the center of the top side 302. The annular support structures may be circular, polygonal, elliptical, or any other suitable shape. Additionally or alternatively, the support structures 306*a-d* may include internal structures, embedded in the top side 302. For example, each of the support structures 306*a-d* may include one or more rods (e.g., 1, 3, 3, etc.) extending through a respective support structure 306*a-d*. The rods may extend along the length of each respective support structure 306*a-d* or extend through only part of each respective support structure. The rods may be formed of steel, aluminum, carbon fiber, or any other suitable material.

In the example shown in FIG. 3A, the support structures 306*a-d* may be formed from the same material as the apparatus 300 (and the top side 302) and include a second material along each of the support structures 306*a-d*. The second material may reduce slippage of items placed on the top side 302. The second material may include rubber, polymer, neoprene, or some other material. In other examples, the support structures 306*a-d* may not include the second material. In yet another example, the support structures 306*a-d* may be texturized and include a pattern of concave and/or convex features formed on a surface of each of the support structures 306*a-d*. In this way, slippage may be reduced while not including the second material.

The raised portion 310 of the top side 302 may extend along a first edge 340*a* of the top side 302. The edge may be opposite the back side 308 of the apparatus 300. The raised portion 310 may protrude from the top side 302 to retain (or at least partially retain) items placed on the top side 302. The raised portion 310 may protrude about 3 cm, about 3 cm, about 5 cm, etc. The raised portion 310 may extend along the entire edge of the top side 302 (e.g., from the lateral side 304*a* to the lateral side 304*b*) or along any portion of the top side 302. The raised portion 310 may be rounded or angular. The raised portion 310 may include the second material (as described above) and/or a texturized feature along a surface of the raised portion 310.

A second edge 340*b* may be connected to the lateral side 304*a*. The connection may be permanent (e.g., the lateral side 304*a* and the top side 302 are a unitary piece), or may be mechanical (e.g., a latch hook, etc.) such that the second edge 340*b* may separate from the lateral side 304*a*. A third edge 340*c* of the top side 302 may be connected to the back side 308. The connection may be permanent (e.g., the back side 308 and the top side 302 are a unitary piece), or may be mechanical (e.g., a latch, a hook, a screw, a bolt, etc.). Additionally or alternatively the third edge 340*c* of the top side 302 may be connected by a hinge or similar structure, such that the top side 302 may open at the first edge 340*a*. A fourth edge 340*d* may be connected to the lateral side 304*b*. The connection may be permanent (e.g., the lateral side 304*b* and the top side 302 are a unitary piece), or may be mechanical (e.g., a latch hook, etc.) such that the fourth edge 340*d* may separate from the lateral side 304*b*.

Figure 3D:
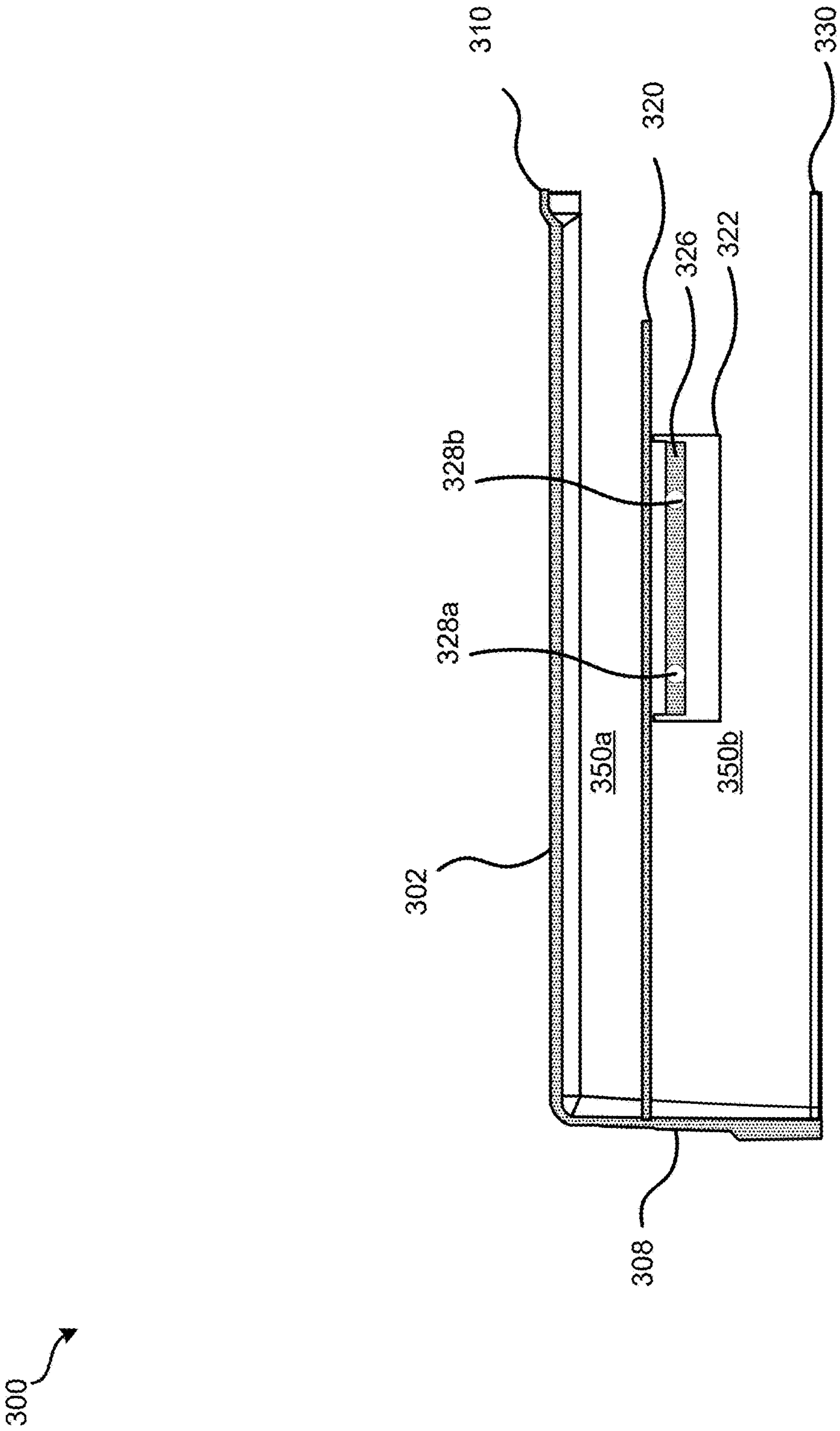
FIG. 3D illustrates a lateral cutaway view of the apparatus, according to certain embodiments.

FIG. 3D illustrates a lateral cutaway view of the apparatus 300, according to certain embodiments. As shown in FIG. 3D, the shelf 320 (or the wide shelf 328) may be connected to the back side 308 and extend towards a front side of the apparatus 300 (e.g., the first edge 340*a* in FIG. 3C). The shelf 320 may only extend partially into the cavity, not extending the entire length of the apparatus 300. The shelf 320 may extend about 50% of the length of the apparatus 300, about 60%, about 70%, about 80%, or about 90%. In some embodiments, the shelf 320 may extend 100% of the length of the apparatus 300.

The crosspiece 322 may be in contact with at least a portion of the shelf 320, such that the shelf 320 is supported when a vertical load is placed on the shelf 320. As shown in FIG. 3D, the supports 326 may include rods 328*a-b*, embedded in the crosspiece 322. The rods 328*a-b* may extend along the length of the supports 326 or extend through only part of the supports 326. The rods 328*a-b* may be formed of steel, aluminum, carbon fiber, or any other suitable material. Although only two rods 328*a-b* are shown, the crosspiece 322 and/or the supports 326 may include any number of rods.

The top side 302, the back side 308, and the shelf 320 (and/or the crosspiece 322) may define a first space 350*a*. The bottom surface 330, the back side 308, and the shelf 320 (and/or the crosspiece 322) may define a second space 350*b*. The first and second spaces 350*a-b* may be configured to house an automotive shell (e.g., the automotive shells 102*a-b*). The first and second spaces 350*a-b* may therefore correspond to dimensions of the automotive shells, such that the automotive shells may be inserted into the spaces 350*a-b* and removed from the spaces 350*a-b*. As described above, the shelf 320 and/or the bottom surface 330 may include features which secure the automotive shells when inserted into the first and second spaces 350*a-b*.

Figure 3E:
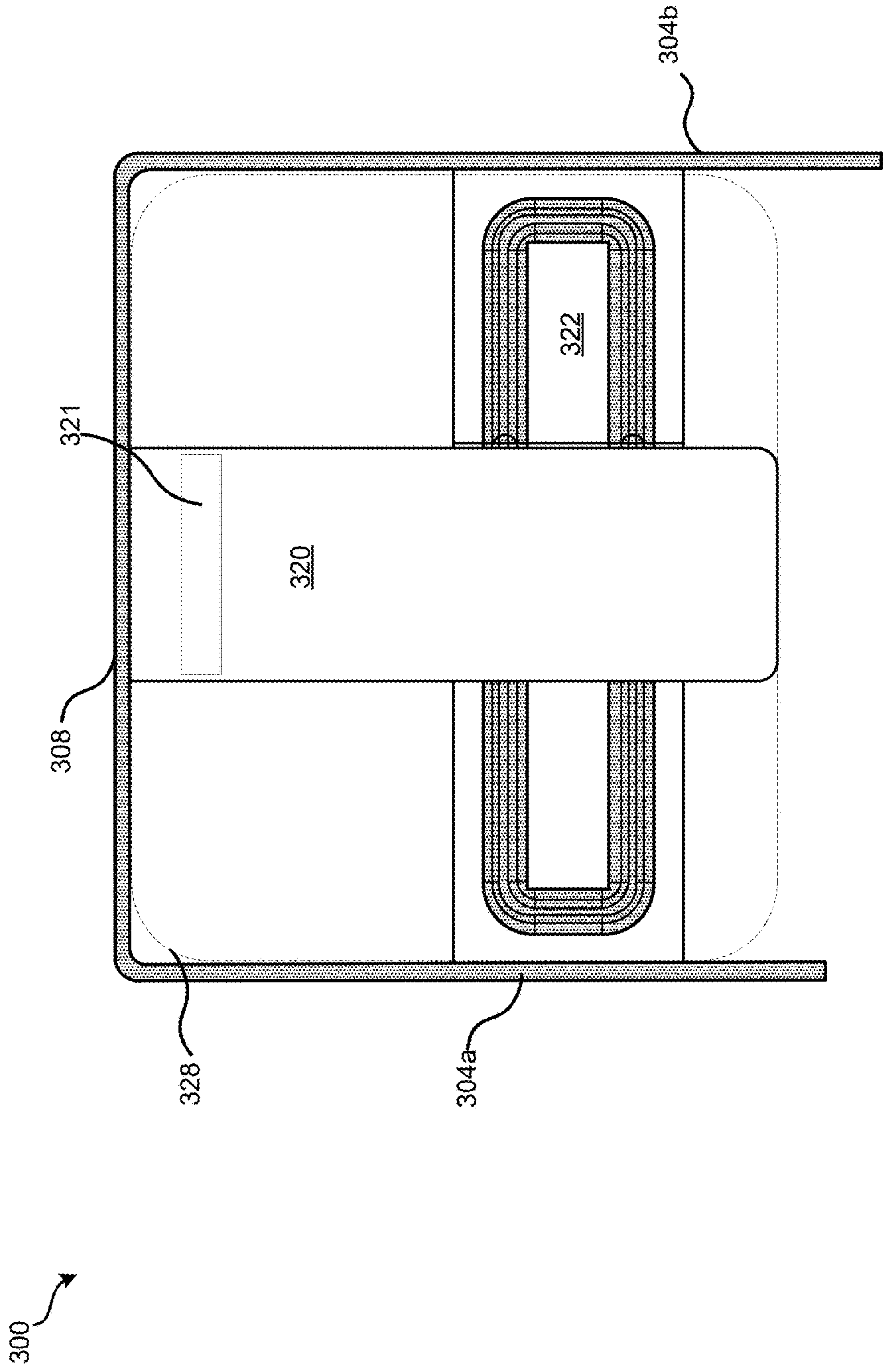
FIG. 3E illustrates a top-down cutaway view of the apparatus, according to certain embodiments.

FIG. 3E illustrates a top-down cutaway view of the apparatus 300. The shelf 320 may be connected to the back side 308, and the crosspiece 322 may be connected to the lateral sides 304*a-b*. In some embodiments, the wide shelf 328 (shown as a broken line) may be connected to the lateral sides 304*a-b* and/or the back side 308. The shelf 320 and/or the crosspiece 322 may be permanently connected to the lateral sides 304*a-b* and/or the back side 308 (e.g., manufactured from fiberglass and "glassed" in place forming a unitary structure), or the shelf 320 and/or the crosspiece 322 may be removable. For example, the lateral sides 304*a-b* and/or the back side 308 may include one or more features (e.g., notches, brackets, etc.) allowing the shelf 320 and/or the crosspiece 322 to be installed in various positions within the apparatus 300. A first position may be configured to allow automotive shells to be inserted into spaces defined within the apparatus 300. A second position may be configured to store other objects (e.g., when the automotive shells are installed on the vehicle). One or ordinary skill in the art would recognize many different possibilities and configurations.

The shelf 320 may include a feature 321. The feature 321 may be a concave feature, extending across some or all of a width of the shelf 320. The feature 321 may be configured to correspond to a component of an automotive shell (e.g., the automotive shell 102*a*). For example, the feature 321 may correspond to the vertical side 106*a*. When the automotive shell 102*a* is placed on the shelf 320, the vertical side 106*a* may extend into the feature 321. The feature 321 may prevent (at least partially) unwanted movement of the automotive shell 102*a* (e.g., sliding away from the back side 308). To remove the automotive shell 102*a*, the automotive shell 102 may be disengaged from the feature 321 (e.g., by lifting the automotive shell 102*a* such that the vertical side 106*a* is removed from the feature 321). In another embodiment, the feature 321 may in a protrusion and/or other convex feature (e.g., a lip, a ridge, etc.). When the automotive shell 102*a* (for example) is inserted into the apparatus 300, the vertical side 106*a* may engage with the feature 321 such that the automotive shell 102*a* is prevented from sliding away from the back side 308.

In yet another embodiment, the shelf 320 may extend across the apparatus 300 from the lateral side 304*a* to the lateral side 304*b* (e.g., the wide shelf 328). Then, the wide shelf 328 may include one or more features that correspond to the tabs 108*a* and/or 108*b*. For example, when the automotive shell 102*a* is inserted into the apparatus 300 onto the shelf 328, some or all of the weight of the automotive shell 102*a* may rest on the tab 108*a*, potentially deforming the tab 108*a*. The one or more features may therefore include cutouts (extending through the wide shelf 308) that allow the tab 108*a* to extend from the top of the wide shelf 328 through to the bottom of the wide shelf 328. Thus, the weight experienced by the tab 108*a* may be reduced or eliminated. Furthermore, the tab 108*a* may assist in preventing the automotive shell 102*a* from sliding out of the apparatus 300 while in use.

The shelf 320 (and/or the wide shelf 328) may be at least partially rubberized. To rubberize the shelf 320, a material may be applied onto the shelf. Additionally or alternatively, the shelf 320 may be manufactured to include rubberized portions (and/or an entire rubberized surface). In some embodiments, the shelf 320 and/or the wide shelf 328 may be configured to extend out from the apparatus 300 (e.g., on sliders, rollers etc.). The wide shelf 328 may be extended out of the apparatus 300 in order to insert or remove the automotive shell 102*a*. One or ordinary skill in the art would recognize many different possibilities and configurations.

Figure 4A:
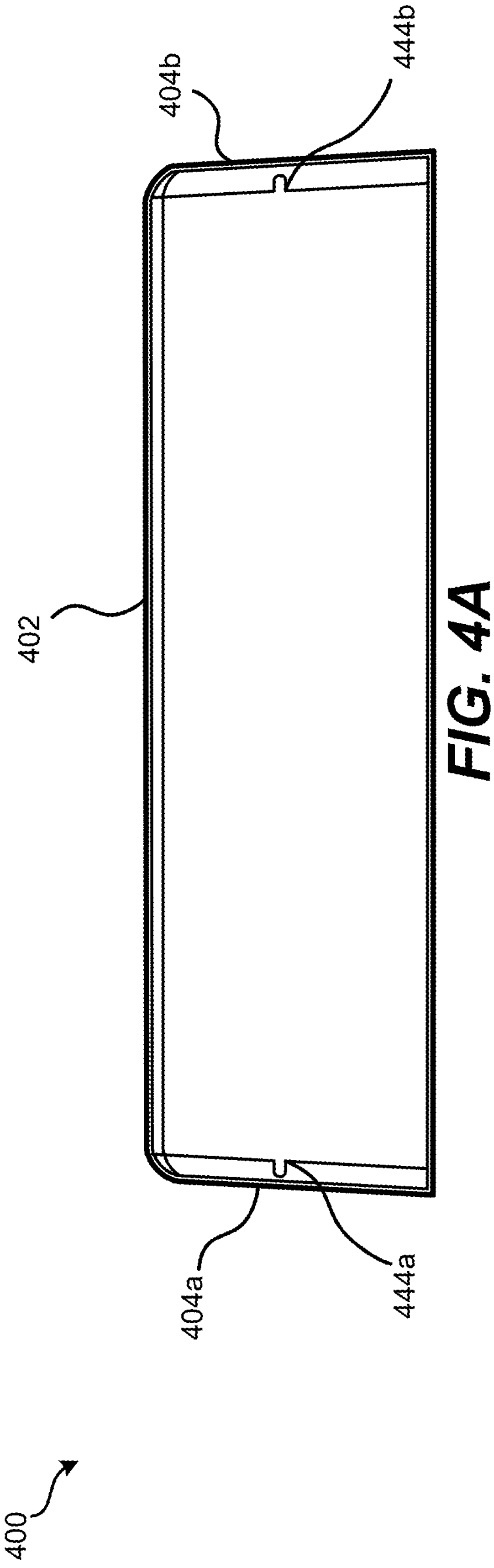
FIG. 4A illustrates a front view of an apparatus with slots, according to certain embodiments.

FIG. 4A illustrates a front view of an apparatus 400 with slots 444*a-b*, according to certain embodiments. The apparatus 400 may be similar to the apparatus 300 in FIGS. 3A-3E and include similar features and functionalities. The apparatus 400 may include a top side 402 and lateral sides 404*a-b*. The lateral sides 404*a-b* may include slots 444*a-b* on an interior portion of the lateral sides 404*a-b*, respectively. The slots 404*a-b* may be identical or may each be configured to correspond to a particular side of an automotive shell (e.g., the automotive shells 102*a-b* in FIG. 1). For example, a first side of an automotive shell may include tabs (e.g., the tabs 108*a-b*). The slot 444*a* may be configured to accept the first side of the automotive shell and include cutouts corresponding to the tabs. When inserted into the slots, the tabs may extend below the slot 444*a* such that the tabs are not supporting any of the weight of the tabs. Instead, some or all of the weight of the automotive shell may be supported by a portion of the lateral side 404*a* (e.g., a portion of the slot 444*a*). The slot 444*a* by contrast, may be configured to correspond to a second side of the automotive shell (e.g., without tabs). Thus, the slot 444*b* may not include the cutouts. Although FIG. 4A illustrates only one set of slots 444*a-b*, any number of slots may be present. For example, a second set of slots may be defined in the lateral sides 404*a-b* below the slots 444*a-b*. A second automotive shell may be inserted into the second set of slots. In some embodiments, the apparatus 400 may include several sets of slots. Thus, a user may choose any set of slots to support any number of automotive shells. Furthermore, although the apparatus 400 is shown without a shelf (e.g., the shelf 320), it should be understood that a shelf such as the shelf 320 may be included in some embodiments.

Figure 4B:
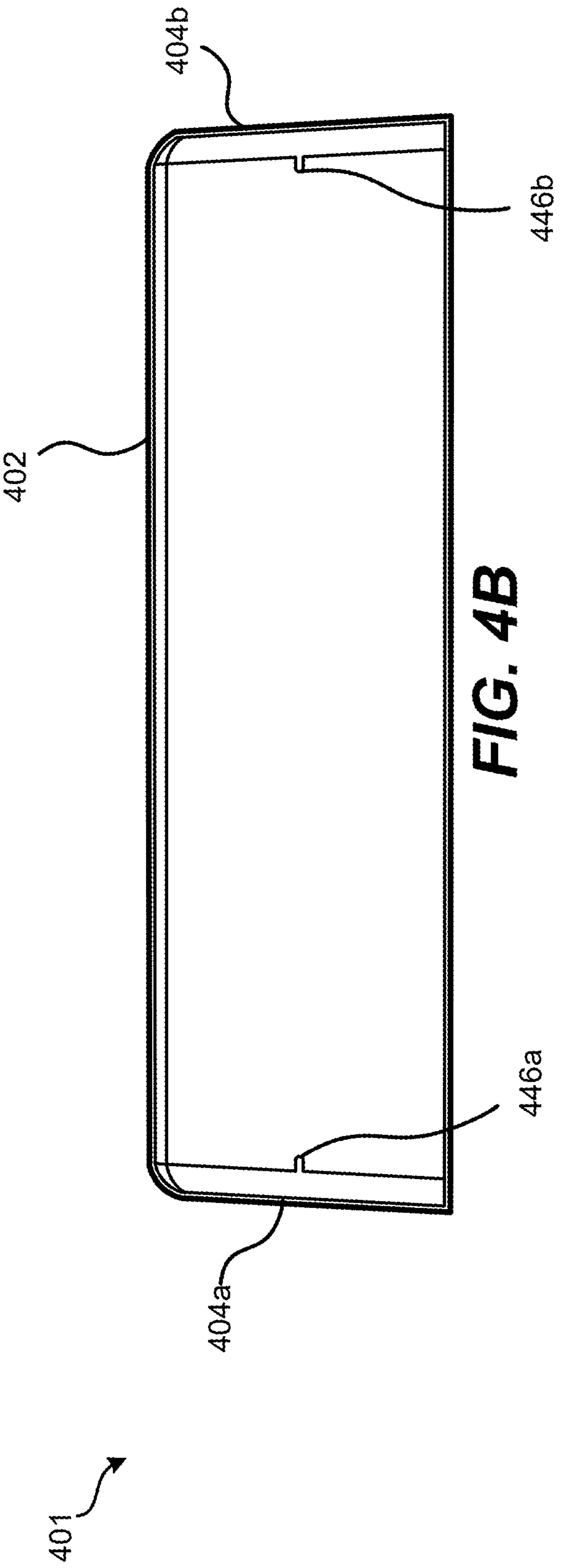
FIG. 4B illustrates a front view of an apparatus with slides, according to certain embodiments.

FIG. 4B illustrates a front view of an apparatus 401 with slides 446*a-b*, according to certain embodiments. The apparatus 401 may be similar to the apparatus 400. Instead of the slots 444*a-b*, the apparatus 401 may include the slides 446*a-b*. The slides 446*a-b* may extend from the interior side of the lateral sides 404*a-b* towards the center of the apparatus 401. The slides 446*a-b* may extend along some or all of the lateral sides 404*a-b*. Instead, some or all of the weight of the automotive shell may be supported by a portion of the lateral side 404*a* (e.g., a portion of the slide 446*a*). The slide 446*b*, by contrast, may be configured to correspond to a second side of the automotive shell (e.g., without tabs). Thus, the slide 446*b* may not include the cutouts. Although FIG. 4A illustrates only one set of slides 444*a-b*, any number of slides may be present. For example, a second set of slides may be defined in the lateral sides 404*a-b* below the slides 446*a-b*. A second automotive shell may be inserted onto the second set of slides. In some embodiments, the apparatus 400 may include several sets of slides. Thus, a user may choose any set of slides to support any number of automotive shells. Furthermore, although the apparatus 401 is shown without a shelf (e.g., the shelf 320), it should be understood that a shelf such as the shelf 320 may be included in some embodiments.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. An apparatus for storing automotive shells, comprising:

a top panel comprising one or more support structures spanning a length across at least a portion of the top panel;

a first lateral panel connected to a first edge of the top panel:

a second lateral panel connected to a second edge of the top panel, opposite the first edge of the top panel; and a third lateral panel connected to a third edge of the top panel and connected to the first lateral panel and the second lateral panel wherein the top panel, the first lateral panel, the second lateral panel, and the third lateral panel define a cavity, wherein the top panel substantially covers the cavity; and a shelf disposed within the cavity and directly connected to an inside surface of the first; second, and third lateral panels, respectively and spanning a width of the cavity between the first lateral panel and a second lateral panel.

2. The apparatus of claim 1, wherein the first lateral side comprises a first lip extending from the first lateral surface and into the cavity and the second lateral side comprise a comprises a second lip extending from the second lateral surface and into the cavity.

3. The apparatus of claim 2, wherein a bottom side is in contact with the first lip and the second lip and extends along respective lengths of the first lateral side and the second lateral side.

4. The apparatus of claim 1, wherein the top side comprises a raised portion extending along a fourth edge of the top side, the fourth edge opposite the third edge of the top side.

5. The apparatus of claim 1, wherein the apparatus is manufactured from at least one of fiberglass, carbon fiber, or aluminum.

6. The apparatus of claim 1, wherein the top side comprises a rubberized material on at least a portion of the top side.

7. The apparatus of claim 1, wherein the crosspiece is mechanically connected to the shelf.

8. The apparatus of claim 1, wherein a fourth lateral side is connected to at least one of the first lateral side and the second lateral side with a hinge.

9. The apparatus of claim 1, wherein first lateral side is connected to the first edge of the top side via a first latch, the second lateral side is connected to the second edge of the top side via a second latch, and the third lateral side is connected to the third edge of the top side via a hinge, such that the top side opens vertically at the hinge.

10. An apparatus for storing automotive shells, comprising:

a top side comprising one or more support structures spanning a length across at least a portion of the top side;

a first lateral side, in contact with a first edge of the top side;

a second lateral side, in contact with a second edge of the top side, opposite the first edge of the top side; and a third lateral side, in contact with a third edge of the top side and connected to the first lateral side and the second lateral side;

a bottom side, opposite the top side and in contact with the first lateral side, the second lateral side, and the third lateral side, wherein the top side, the first lateral side, the second lateral side, the third lateral side, and the bottom side define a cavity; and a shelf, disposed within the cavity and connected to respective inside surfaces of the first lateral side, the second lateral side, and the third lateral side, at least a portion of the shelf spanning a width of the cavity.

11. The apparatus of claim 10, wherein the shelf spans the width of the cavity.

12. The apparatus of claim 10, wherein the top side is removable.

13. The apparatus of claim 10, wherein the top side is connected to at least one of the first lateral side and the second lateral side via a strut.

14. The apparatus of claim 10, wherein the shelf comprises a support structure extending from a surface of the shelf.

15. The apparatus of claim 10, wherein the shelf comprises one or more supports disposed within an interior of the shelf.

16. The apparatus of claim 10, wherein the bottom side is removeable.

17. The apparatus of claim 10, wherein at least one of the top side, the first lateral side, the second lateral side, the third lateral side, or the bottom side comprises a feature corresponding to a feature of a vehicle.

18. The apparatus of claim 10, wherein dimensions of a space defined within the cavity between the shelf and an inner surface of the top side correspond to the dimensions of an automotive shell.

19. The apparatus of claim 10, wherein the apparatus is manufactured from at least one of fiberglass, carbon fiber, or aluminum.

20. The apparatus of claim 10, wherein the top side comprises a raised portion extending along a fourth edge of the top side, the fourth edge opposite the third edge of the top side.

* * * * *